United States Patent
Mikus

(10) Patent No.: US 6,325,710 B1
(45) Date of Patent: Dec. 4, 2001

(54) COATED SILICON NITRIDE BASED CUTTING TOOLS

(75) Inventor: Marian Mikus, Skåholmen (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/536,398

(22) Filed: Mar. 28, 2000

(30) Foreign Application Priority Data

May 4, 1999 (SE) .................................................. 9901589

(51) Int. Cl.$^7$ ...................................................... B23F 21/03
(52) U.S. Cl. ........................ 451/540; 451/541; 451/548; 451/556
(58) Field of Search ................................... 451/540, 541, 451/548, 556

(56) References Cited

U.S. PATENT DOCUMENTS

| | | | |
|---|---|---|---|
| 4,406,670 | * 9/1983 | Sarin et al. | 51/295 |
| 4,431,431 | 2/1984 | Sarin et al. | 51/295 |
| 4,440,547 | 4/1984 | Sarin et al. | 51/295 |
| 4,670,024 | 6/1987 | Bhat et al. | 51/295 |
| 5,021,372 | * 6/1991 | Pyzik et al. | 501/97 |
| 5,915,162 | * 6/1999 | Uchino et al. | 428/551 |

FOREIGN PATENT DOCUMENTS

| | | |
|---|---|---|
| 61160494 | 5/1986 | (JP) . |
| 63040785 | 2/1988 | (JP) . |

* cited by examiner

*Primary Examiner*—Joseph J. Hail, III
*Assistant Examiner*—David B. Thomas
(74) *Attorney, Agent, or Firm*—Burns, Doane, Swecker & Mathis, L.L.P.

(57) ABSTRACT

The present invention relates to coated silicon nitride based cutting tools and a method of making the same. By a carburizing heat treatment prior to the deposition of the coating, an improved bonding strength of the coating is obtained. A continuous or semicontinuous transition zone of 2–10 $\mu$m thickness is formed between the substrate and the inner layer of the coating in which transition zone the glass phase is replaced by the material of the inner layer.

7 Claims, 6 Drawing Sheets

COATED SILICON NITRIDE BASED CUTTING TOOLS

BACKGROUND OF THE INVENTION

The present invention relates to coated silicon nitride based cutting tools and a method of making the same. By a special heat treatment prior to the deposition of the coating, an improved bonding strength of the coating is obtained.

Silicon nitride is a highly covalent compound with a number of interesting engineering properties. An adverse effect of the strong bonding is a low self diffusivity which is why the material cannot be consolidated by solid state sintering. Sintering additives such as $Al_2O_3$, $Y_2O_3$ and MgO are used to form a liquid with the $SiO_2$ which is always present on the surface of the $Si_3N_4$ grains. The resulting material has a two-phase microstructure of silicon nitride grains embedded in an intergranular bonding phase, which is normally a glass. During sintering, the silicon nitride grains obtain an elongated shape which has a positive effect on the fracture toughness of the material.

Uncoated silicon nitride cutting tools are used in cutting or milling applications of the cast irons. Attempts have been made to improve the tool life of the silicon nitride insert by application of wear resistant coatings. Coated silicon nitride cutting tool inserts are known, e.g., by the Sarin et al. U.S. Pat. Nos. 4,440,547, 4,431,431, etc.

However, the coating adhesion is not always satisfactory.

OBJECTS AND SUMMARY OF THE INVENTION

It is an object of this invention to avoid or alleviate the problems of the prior art.

It is further an object of this invention to provide a method of improving the adhesion of a coating on a silicon nitride based insert.

In one aspect of the invention there is provided a silicon nitride based cutting tool comprising a silicon nitride containing substrate including a glass phase, a single or multilayer outer coating and a continuous or semicontinuous transition zone of 2–10 μm thickness between the substrate and the inner layer of the outer coating in which transition zone the glass phase is replaced by the material of the inner layer.

In another aspect of the invention there is provided a method of making a coated silicon nitride based cutting tool comprising a substrate and a single or multilayer outer coating comprising treating the substrate in a carburizing atmosphere at 850–1375° C. and thereafter depositing the single or multilayer coating.

BRIEF DESCRIPTION OF THE DRAWINGS

In FIGS. 1–3:

X1—$Al_2O_3$-layer

Figure 1A:
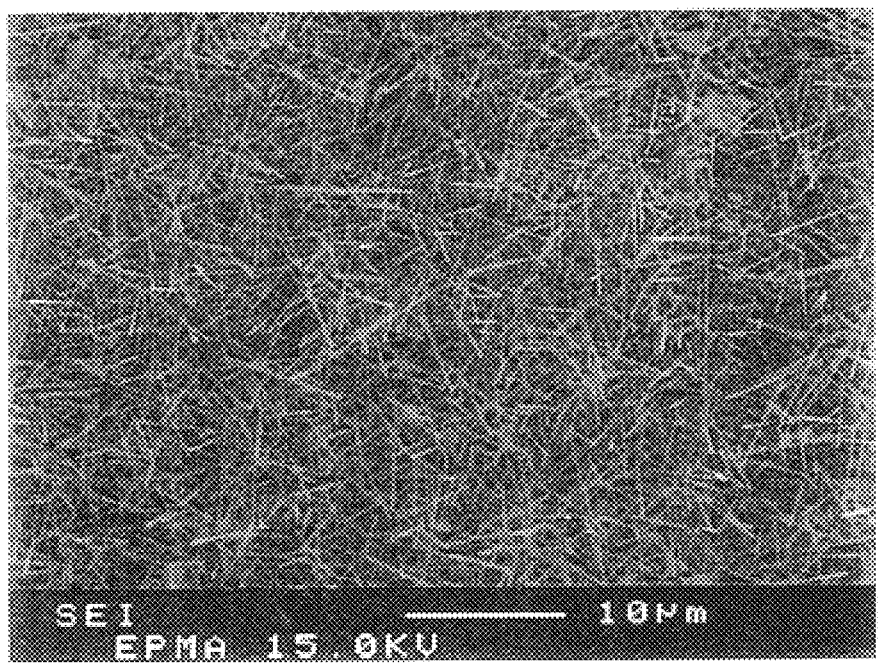
FIGS. 1A and 1C are micrographs which show various magnifications of the microstructure of the surface of a silicon nitride based cutting insert treated according to the invention.

X2—TiN-layer. In FIG. 1 this layer also contains SiC whiskers

X3—silicon nitride insert

X4—transition zone coating-insert

DETAILED DESCRIPTION OF THE PREFERRED EMBODIMENTS OF THE INVENTION

It has now surprisingly been found that by subjecting a silicon nitride based cutting insert to a carburizing treatment an improved adhesion of a subsequently deposited coating can be obtained. Besides improved coating adhesion, in certain embodiments the fracture toughness of the coating is improved.

According to the method of the present invention, a carburizing heat treatment of $Si_3N_4$-based bodies results in an improved adhesion of a subsequently deposited coating. The carburizing heat treatment takes place in a carbon containing surrounding such as a gas mixture of $CH_4$ (up to 25%) and $H_2$ (75% or more) at a temperature of 850–1375° C., preferably 1250–1330° C., for 5 minutes up to 5 hours, preferably 10–60 minutes, longer times being selected for lower temperatures and vice versa. The carburizing treatment can be also performed in a plasma containing a $CH_4$ +$H_2$-gas mixture and then the carburizing time and/or temperature can be decreased. The carburizing treatment causes a change of the structure and the composition of a surface zone 2 to 200 μm, preferably 5 to 20 μm thick.

In one embodiment, the bodies are arrayed on a suitable support (e.g., graphite) with a large free volume >200% of the volume occupied by the bodies around each body and carburized. In this embodiment, SiC whiskers are formed and completely cover the surface of the body and at the same time the surface zone is partially depleted in glass phase. The glass phase contains Si, Al, N, O and other sintering aid elements such as Mg or Y. The particular composition will vary depending upon the sintering conditions. Various amounts of SiC are also present in the form of particles and/or semicontinuous-continuous layers between 0.3–2 μm thick as well on the body surface between SiC whiskers to a lesser extent within the glass phase depleted zone. Whiskers grow from the silicon nitride based bodies surface at various angles. They are between 3 and 300 μm long and between 0.3 and 1.5 μm thick. The length and thickness of the whiskers depend on the carburizing conditions. Longer carburizing time gives longer whiskers and higher carburizing temperature gives thicker whiskers.

In another embodiment, the bodies are placed in a graphite box during the heat treatment with a small free volume between 30% and 200% of the volume occupied by the bodies. In this embodiment, only small amounts of the SiC whiskers are formed on the surface of the bodies. Depending on carburizing conditions, surface zones are formed containing SiC particles forming semicontinuous-continuous layers 0.3–2 μm thick having adjacent surface zone depleted in glass phase. SiC containing zones are more easily formed at higher carburizing temperatures (higher than 1300° C.) and/or longer carburizing times. If the carburizing temperature is rather low (1200–1300° C.) or carburizing time is short, then no or less SiC particles containing interlayer is formed but the surface zone is depleted in glass phase between 2 and 10 μm depth. After carburizing, the surface zone is much rougher than before carburizing. In addition to SiC, other carbides or metals formed during carburizing treatment from the phases present within the silicon nitride substrate can be found. The formation of the SiC whiskers is faster if the carburizing is performed after application of a thin layer containing fine carbon powder to the body surface. Preferably, the carbon powder shall contain about 20 vol % of the total carbon content in the form of volatile compounds.

The structure thickness of the glass phase depleted zone is influenced by the structure and the distribution of the glass phase within the body prior to carburizing. If the glass phase is unevenly distributed, the thickness of the depleted zone will vary more than for bodies with even glass phase distribution. In areas with higher contents of the glass phase prior to carburizing, the thickness of the depleted zone will be larger than in areas with lower concentration of the glass phase.

After the carburizing treatment, the inserts are coated with wear resistant coatings, containing single or multiple layers such as TiN, Ti(C,N), Ti(C,O), Ti(C,N,O) and/or $Al_2O_3$ in accordance with conventional techniques. A continuous or semicontinuous transition zone of 2–10 μm thickness between the substrate and the inner layer of the coating is formed in which transition zone the glass phase is essentially replaced by the material of the inner layer. The coating thickness is between 2 and 250 μm, preferably between 5 and 20 μm. However, bodies with long whiskers (between 15 and 230 μm long) on the surface of the depleted zone will after the coating process contain thick coatings (between 20 and 250 μm thick) which are reinforced by in situ formed SiC whiskers. In order to decrease the tension between the coating and the silicon nitride body caused by differences in thermal expansion between the coating and silicon nitride based bodies, it is in this case suitable to add to the silicon nitride based bodies up to 35 vol % wear resistant particles such as metal nitrides, carbonitrides (such as TiN, Ti(C,N)), and/or oxides (such as $ZrO_2$), with large coefficient of thermal expansion. Coating of the surface zones containing long whiskers, i.e., whiskers up to 230 μm long, can be made by conventional CVD or MTCVD technique or by infiltration with wear resistant phases by known technique, (including sol-gel technique and resintering under high pressure).

If the coated body shows too large a surface roughness, it is suitable to decrease the surface roughness by a mechanical treatment using known technique.

The invention is additionally illustrated in connection with the following Examples which are to be considered as illustrative of the present invention. It should be understood, however, that the invention is not limited to the specific details of the Examples.

EXAMPLE 1

Figure 1B:
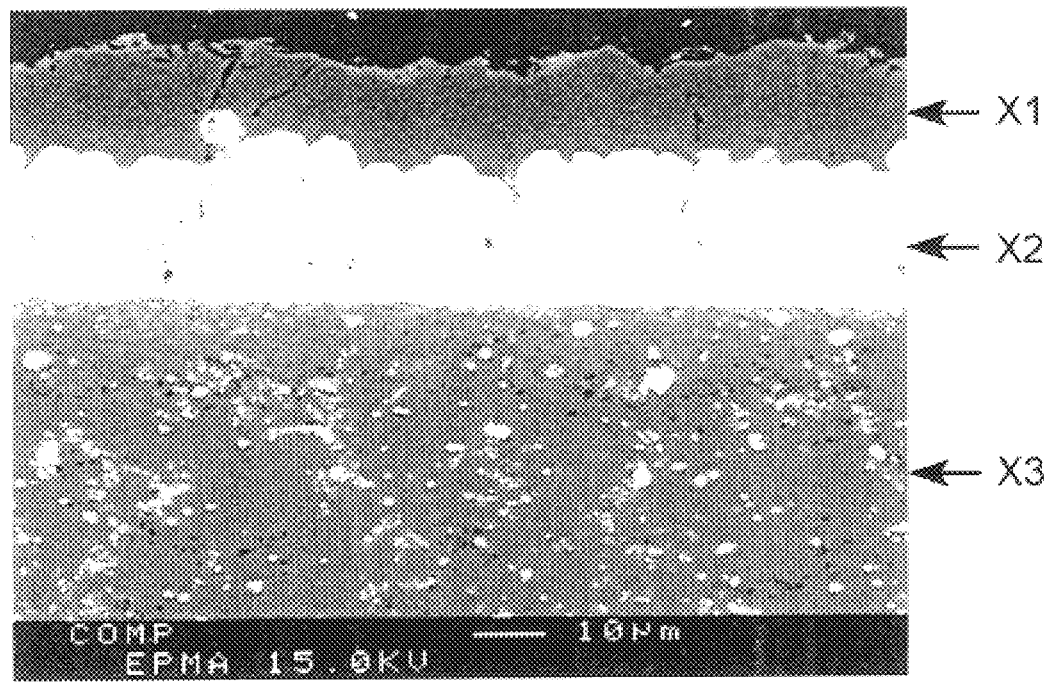
FIGS. 1B and 1D are micrographs which show various magnifications of the microstructure of a cross-section of a coated insert according to the invention.
Figure 1C:
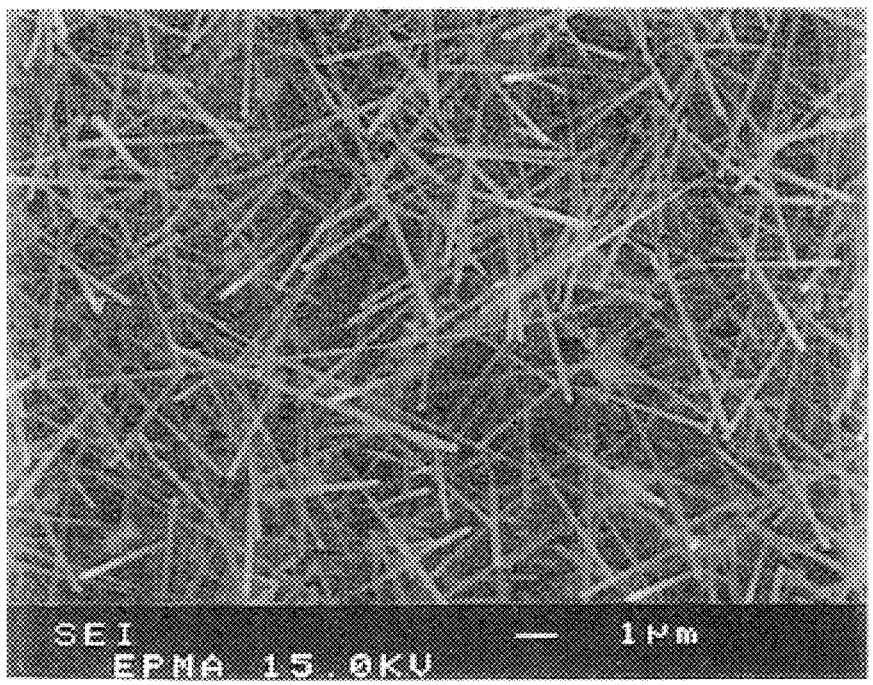
Figure 1D:
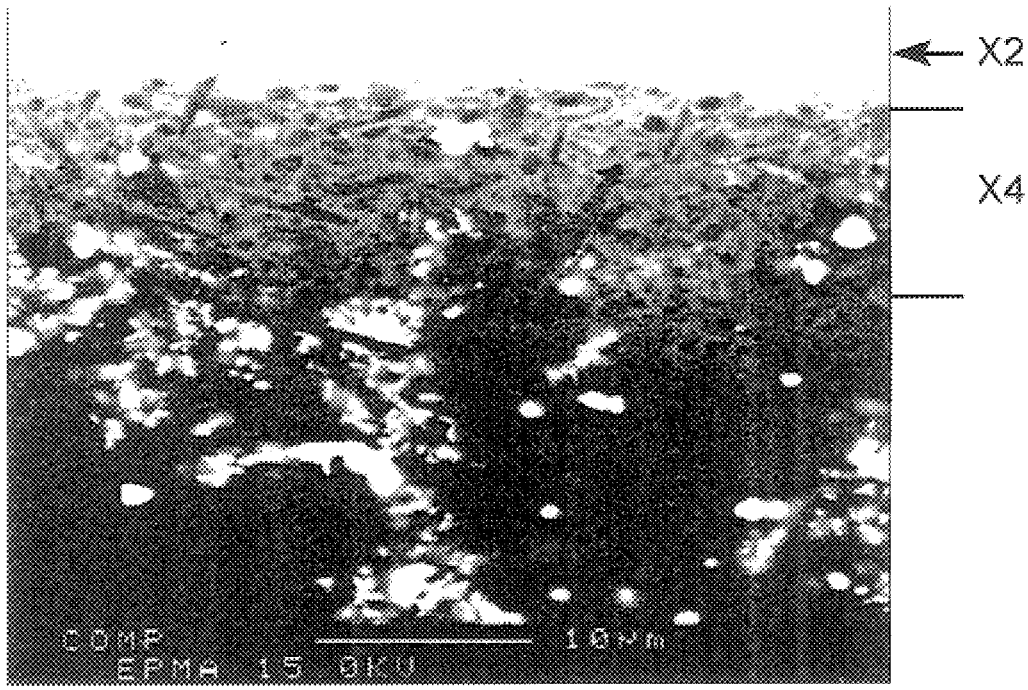

Silicon nitride cutting tool inserts A, of style SNGA120712, S02520 were produced by sintering in a conventional way. The composition (in weight-%) was: Si 54.8, N 32.9, Al 0.6, Zr 3.8, Mg 3.7 and O 4.2. Phases present were beta $Si_3N_4$ (Z-value=0) and tetragonal $ZrO_2$. After grinding and cleaning treatments, the inserts were subjected to the following carburizing heat treatment: 10 minutes at 1300° C. in 20 mbar $CH_4$+980 mbar $H_2$. The heat treatment was performed with the inserts placed on a graphite support with a large volume of free surrounding space (much larger than 200% of the volume of the inserts). A metallographic examination showed that the insert surface contained a large quantity of about 300 nm thick and between 10 and 15 μm long SiC whiskers growing from the silicon nitride surface at various angles. The microstructure images of a silicon nitride surface after carburizing treatment are shown in FIGS. 1A and 1C. The silicon nitride surface zone was depleted from the glass phase within a 5 to 10 μm thick zone. Within this zone, various amounts of SiC were found to be present, The inserts were coated with 5 μm TiN and 12 μm α-$Al_2O_3$ coatings. A metallographic investigation of the insert cross-section showed that the areas present within the surface zone depleted in glass phase (transition zone) were infiltrated by TiN and the volume present between SiC whiskers was infiltrated by TiN. The microstructure images are shown in FIGS. 1B and 1C (in image 1D the transition zone is marked X4). The total coating thickness was TiN(+SiC whiskers)–20 μm and $Al_2O_3$–12 μm. The coated inserts passed through a conventional mechanical treatment, which decreased the surface roughness of the coatings.

For comparison, the same types of inserts were used, insert REF A, but without carburizing treatment.

Cutting test:

The inserts were tested in a longitudinal turning operation without coolant. The work piece consisted of five discs of cast iron SS0125, which were pressed together in order to provide a large amount of cast iron skin, i.e., abrasive wear, and a certain degree of intermittence during each cut. Cutting speed was 750 m/min, feed 0.4 mm/rev and depth of cut 2/0 mm. Three edges per insert type were tested and the life was determined by any of the following criteria:

flaking of the coating a flank wear (VB) exceeding 0.5 mm rupture too large wear in the minor cutting edge too large wear at the depth of cut The tool life of insert A (invention) was about 60% larger than that of insert REF A without carburizing heat treatment. Extensive flaking was observed in insert REF A without carburizing heat treatment. The observed improvement in tool life for the insert A is believed to a large extent be caused by improved bonding of the coating to the silicon nitride substrate.

EXAMPLE 2

Figure 3A:
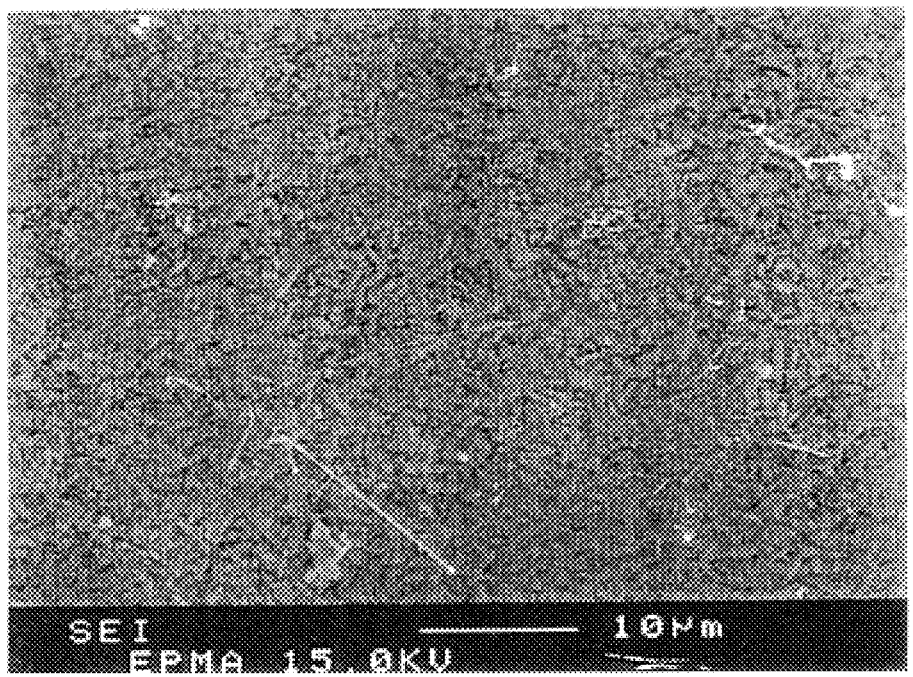
FIGS. 3A and 3C are micrographs which show various magnifications of the microstructure of a surface of the material according to yet a further aspect of the present invention.
Figure 3B:
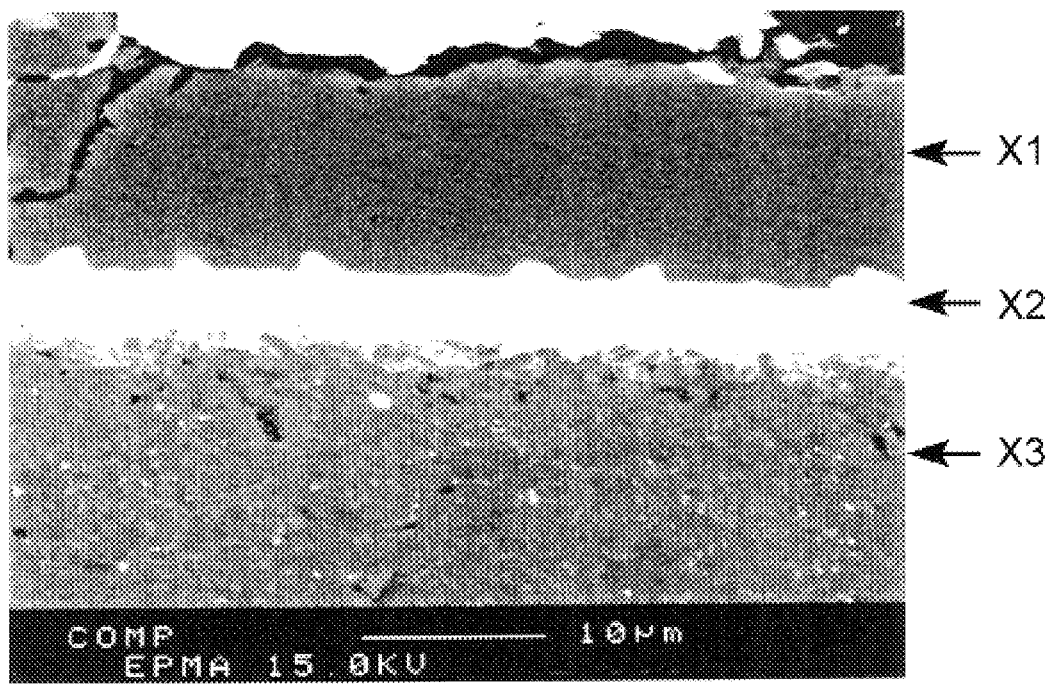
FIGS. 3B and 3D are micrographs which show various magnifications of the microstructure of a cross-section of the material of FIGS. 3A and 3C.
Figure 3C:
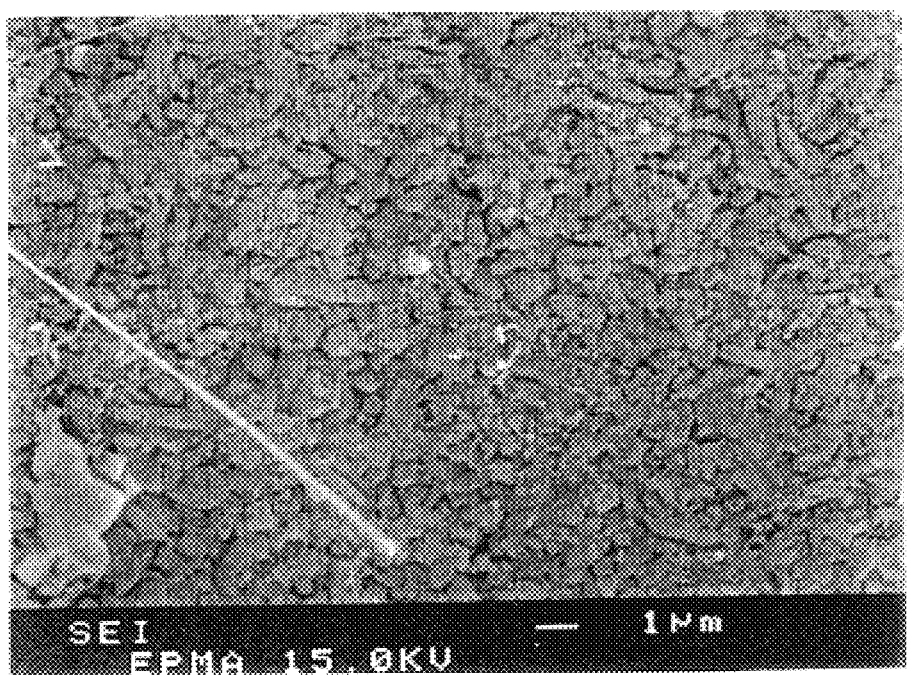
Figure 3D:
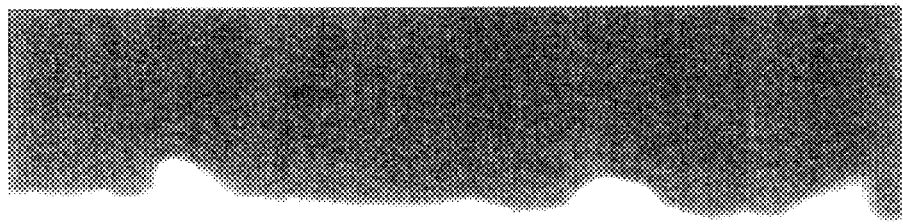
Figure 3D:
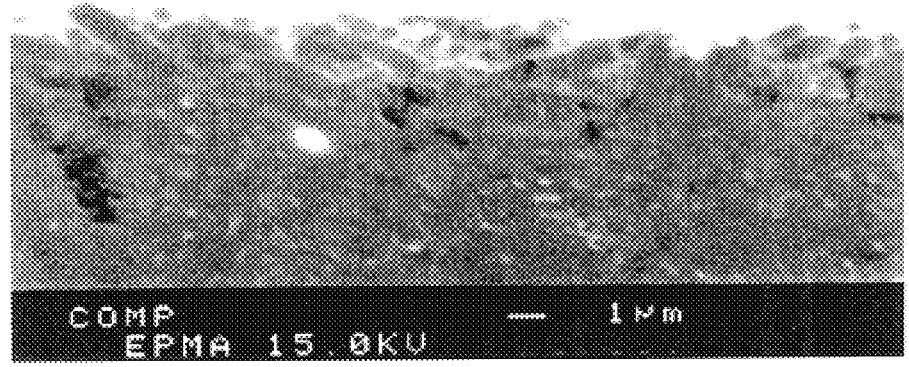

Silicon nitride cutting tool inserts B, of style SNGA120712, S02520 were sintered in a conventional way. The composition in weight % was: Si 58.9, N 37.7, Al 0.2, Zr 0.8, Mg 0.5, O 1.8 and C 0.1. Phases present were beta $Si_3N_4$ (Z-value=0.06). After grinding, edge rounding and cleaning treatments, the inserts were subjected to carburizing heat treatment: 60 min 1325° C. in 20 mbar $CH_4$+980 mbar $H_2$. The heat treatment was performed with the inserts placed within a graphite box with a small volume of free surrounding space (about 100% of the volume of the inserts). Metallographic examination showed that the insert surface was depleted from the glass phase within a 2 to 5 μm thick zone. The microstructure images of the silicon nitride surface after carburizing treatment are shown in FIGS. 3A and 3C. Small amounts of rather long SiC whiskers were also present. In this case, the presence of unevenly distributed long SiC whiskers has a negative effect on the coating roughness. In order to decrease the surface roughness of the coating surface, the inserts, prior to coating, were subjected to a mechanical cleaning operation during which SiC whiskers were removed. Then the inserts were coated with a 5 µm TiC and 12 µm α-$Al_2O_3$ coating in the conventional way. A metallographic investigation of the insert cross-section showed that the areas within the surface zone depleted in glass phase were infiltrated by TiN. The microstructure images of the insert cross-section are shown in FIGS. 3B and 3D (in image 3D the transition zone is marked X4). The coated inserts passed through a conventional mechanical treatment, which decreased the surface roughness of the coatings.

For comparison, the same type of inserts were used, insert REF B, but without carburizing treatment.

The same cutting test as in Example 1 was made.

Tool life of insert B (invention) was about 40% larger than that of insert REF B without carburizing heat treatment. Extensive flaking was observed in the reference inserts. Thus, the observed improvement in tool life for the insert B is believed to be caused by improved bonding of the coating to the silicon nitride substrate.

EXAMPLE 3

Figure 2A:
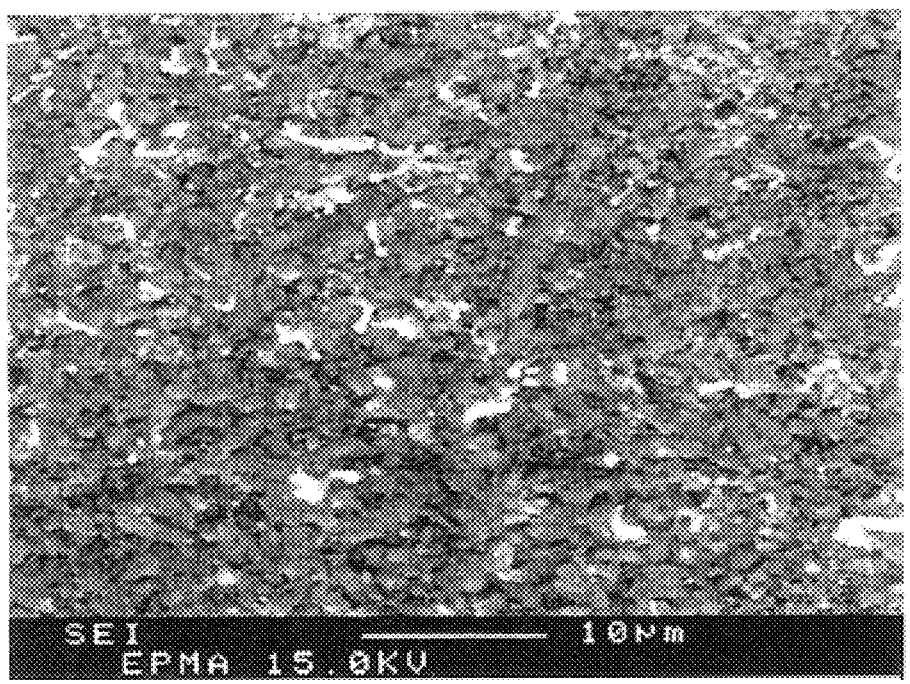
FIGS. 2A and 2C are micrographs which show various magnifications of the microstructure of a surface of the material according to another aspect of the invention.
Figure 2B:
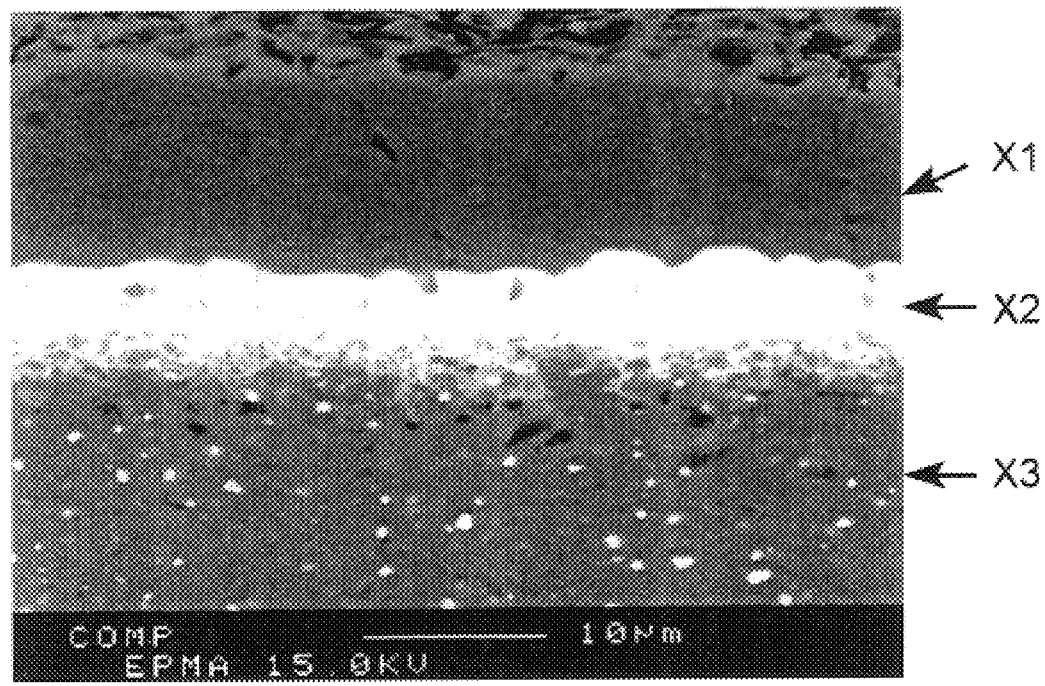
FIGS. 2B and 2D are micrographs which show various magnifications of the microstructure of a cross-section of the material of FIGS. 2A and 2C.
Figure 2C:
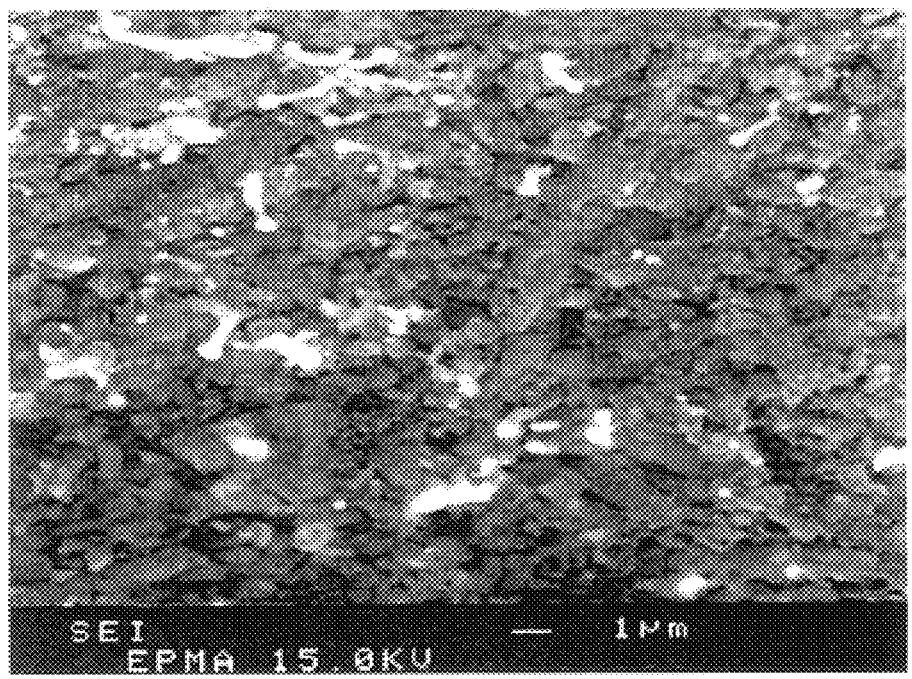
Figure 2D:
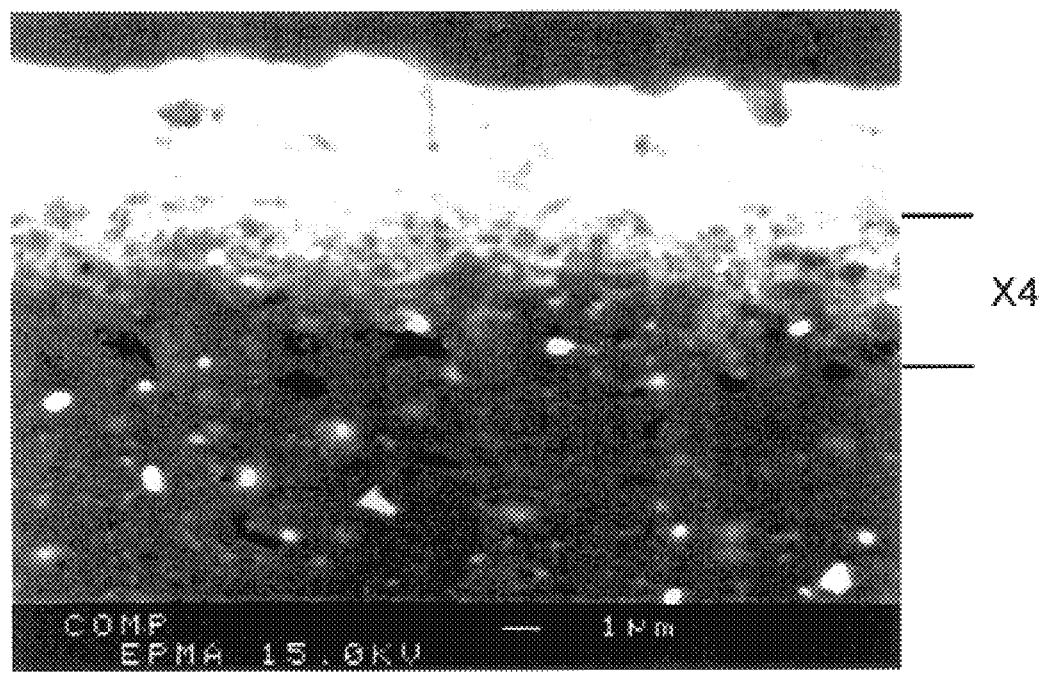

Silicon nitride cutting tool inserts C, of style SNGN120712, S02520 were sintered in a conventional way. The composition of the starting mixture was $Si_3N_4$ (97 wt-%, UBE SN-E10), $Y_2O_3$ (1 wt-%), $Al_2O_3$ (0.5 wt-%) and $Nb_2O_5$ (1.5 wt-%). Phases present were beta $Si_3N_4$ (Z-value=0). After grinding, edge rounding and cleaning treatments, the inserts were subjected to carburizing heat treatment: 60 minutes 1300° C. in 20 mbar $CH_4$+980 mbar $H_2$. The heat treatment was performed with the inserts placed in a graphite box with a small volume of free surrounding space (about 100% of the volume of the inserts). A metallographic examination showed that the insert surface is rather uneven containing large amounts of small holes present between $Si_3N_4$ and SiC particles. Small amounts of short (1–3 µm long) SiC whiskers growing from the silicon nitride surface at various angles were also present. The microstructure images of a silicon nitride surface after carburizing treatment are shown in FIGS. 2A and 2C. The areas present between the SiC whiskers contain various amounts of SiC particles and small holes. It is believed that the reason why such a rough surface was obtained is the depletion of the glass phase leading to the formation of the holes and also the formation of the SiC whiskers and SiC particles forming a semicontinuous interlayer. The silicon nitride surface zone was depleted of glass phase in an up to 3 µm thick zone. Within this zone, a certain increase of the carbon content (SiC) was observed. The inserts were coated with 5 µm TiN and 12 µm α-$Al_2O_3$ coating in the conventional way. A metallographic investigation of the insert cross-section showed that a transition zone was formed consisting of an intergrown mixture of TiN and carburized parts of the surface zone of the silicon nitride insert, depleted in glass phase. The microstructure images of an insert cross-section after coating are shown in FIGS. 2B and 2D (in image 2D the transition zone is marked X4). The size of the transition zone was between 2 and 4 µm. The coated inserts passed through a conventional mechanical treatment which decreased the surface roughness of the coatings.

For comparison, they same type of inserts were used, insert REF C, but without carburizing treatment.

Cutting test according to Example 1 was performed with the following result.

The tool life of insert C (invention) was about 60% larger than that of Insert REF C without carburizing heat treatment. Extensive flaking was observed in the reference inserts. Thus, observed improvement in tool life for the insert C is believed to a large extent to be caused by improved bonding of the coating to the silicon nitride substrate.

The invention has been described with reference to silicon nitride materials containing $Si_3N_4$ and low amounts of glass phase. Similar improvements in coatings adhesion as observed for the silicon nitride inserts can also be expected for the group of materials called SiAlONs, including β phase SiAlONs with Z-value up to 4.2 and α+β SiAlON with various proportions between α and β phases. Silicon nitride based materials can also contain up to 35 vol % of other wear resistant phases such as nitrides or carbonitrides of Ti, Ta, Nb, Hf and Zr (also mixtures of these elements) and up to 35 vol % of the oxides Zr and/or Hf.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A silicon nitride based cutting tool comprising a silicon nitride containing substrate including a glass phase, a single or multilayer outer coating and a continuous or semicontinuous transition zone of 2–10 µm thickness between the substrate and the inner layer of the outer coating in which transition zone the glass phase is replaced by the material of the inner layer.

2. The cutting tool of claim 1 wherein the transition zone contains SiC particles forming semicontinuous or continuous layers 0.3–2 µm thick.

3. The cutting tool of claim 1 wherein the outer coating and/or transition zone contains SiC whiskers.

4. The cutting tool of claim 3 wherein the coating contains SiC whiskers and is 20–250 µm thick.

5. A method of making a coated silicon nitride based cutting tool comprising a substrate and a single or multilayer outer coating comprising treating the substrate in a carburizing atmosphere at 850–1375° C. and thereafter depositing the single or multilayer coating.

6. The method of claim 5 wherein said carburizing treatment is performed on the substrate in a container with a small free volume between 30 and 200% of the volume occupied by the substrate.

7. The method of claim 5 wherein said carburizing treatment is performed on the substrate in a container with a large free volume more than 200% of the volume occupied by the substrate.

* * * * *